Dec. 12, 1972  W. HOEHN  3,706,035
INTEGRABLE REVOLUTION MEASURING CIRCUIT WITH
SUPPLY VOLTAGE TRANSIENT SUPPRESSION
Filed May 5, 1971  2 Sheets-Sheet 1

INVENTOR
WOLFGANG HOEHN
BY Stephen A Young
ATTORNEY

United States Patent Office 3,706,035
Patented Dec. 12, 1972

3,706,035
INTEGRABLE REVOLUTION MEASURING CIRCUIT WITH SUPPLY VOLTAGE TRANSIENT SUPPRESSION
Wolfgang Hoehn, Freiburg, Germany, assignor to ITT Industries, Inc., New York, N.Y.
Filed May 5, 1971, Ser. No. 140,390
Claims priority, application Germany, May 23, 1970,
P 20 25 245.3
Int. Cl. G01r 23/02; G01p 3/48, 3/54
U.S. Cl. 324—169
9 Claims

ABSTRACT OF THE DISCLOSURE

This relates to a monolithic integrable circuit for measuring the rate of revolutions of combustion engines. A monostable multivibrator is triggered by the sharp needle-shaped part of each ignition pulse and generates rectangular pulses of constant duration which are integrated by an indicating measuring instrument.

BACKGROUND OF THE INVENTION

This invention relates to a monolithic integrable circuit for measuring the rate of revolutions of combustion engines. Electronic measuring of the rate of revolutions of combustion engines can be carried out in accordance with various principles. One known principle in Otto engines utilizes the ignition pulse voltage as the quantity to be measured, which pulses are shaped in a Schmitt trigger, said shaped pulses are applied to a monostable multivibrator, and the output pulses thereof of constant pulse width are applied to an integrating indicating instrument (cf. German Printed Application (DAS) 1.235.643 and German Published Application (DOS) 1.523.155).

SUMMARY OF THE INVENTION

Accordingly, the present invention relates to a monolithic integrable circuit for measuring the rate of revolutions of combustion engines by using the ignition pulse voltage or a pulse voltage derived therefrom for triggering a monostable multivibrator, which is followed by an integrating current measuring instrument for indicating the number of revolutions, the monostable multivibrator consisting of one transistor which is off in its stable switching state, and of one transistor which is on in its stable switching state having the base electrode thereof being coupled to the operating voltage through a resistor.

It is the object of the invention to provide a monolithic integrable solid state circuit for measuring the rate of a combustion engine.

Except for the capacitor contained in the multivibrator circuit, the charging resistor and the current measuring instrument, all components essential for operation are combined in the solid state circuit. In particular, the circuit is so designed as to be insensitive to noise or interference pulses acting upon the circuit via the operating voltage during the stable switching state of the monostable multivibrator. Such interference pulses often occur in combustion engines operated in motor vehicles, because the voltage for the car's network is either generated by the car battery (when the car is standing) or by the electric generator (when the car is driven).

In the general problem relating to the integration of a circuit for measuring the rate of revolutions there is also included the further requirement that, for economical reasons, that the circuit for measuring the rate of revolutions shall only be responsive to or triggered by the sharp needle-shaped part of the ignition pulse, while being no longer responsive to the decaying oscillation pulses appearing after the first needle-shaped pulse with respect to time.

The described problem is solved by the aforementioned monolithic integrable circuit for measuring the rate of revolutions of combustion engines in that exclusively to the blocked transistor there is assigned a network containing active and passive components for rendering the stable switching state of the monostable multivibrator insensitive to interference pulses superimposed upon the operating voltage, and for recharging the capacitor after termination of the metastable switching state during a period of time which is very short in relation to the duration thereof, that exclusively to the unblocked transistor there is assigned a network containing active components for permitting the selection of a high-ohmic charging resistor, and that the duration of the metastable switching state is shorter than 70% of the charging time constant of the RC-circuit composed of the charging resistor and the capacitor. It has found to be of a particular advantage when the duration of the metastable switching state amounts to about 50 to 65% of the charging time constant of the RC-circuit composed of the charging resistor and the capacitor. Moreover, optimum properties will result when keeping the charging time of the capacitor as small as possible compared to the duration of the metastable switching state, for example, smaller by the factor 100.

In both circuit arrangements the circuit part framed by the dash lines is monolithically integrable.

DESCRIPTION OF THE PREFERRED EMBODIMENTS

Figure 1:
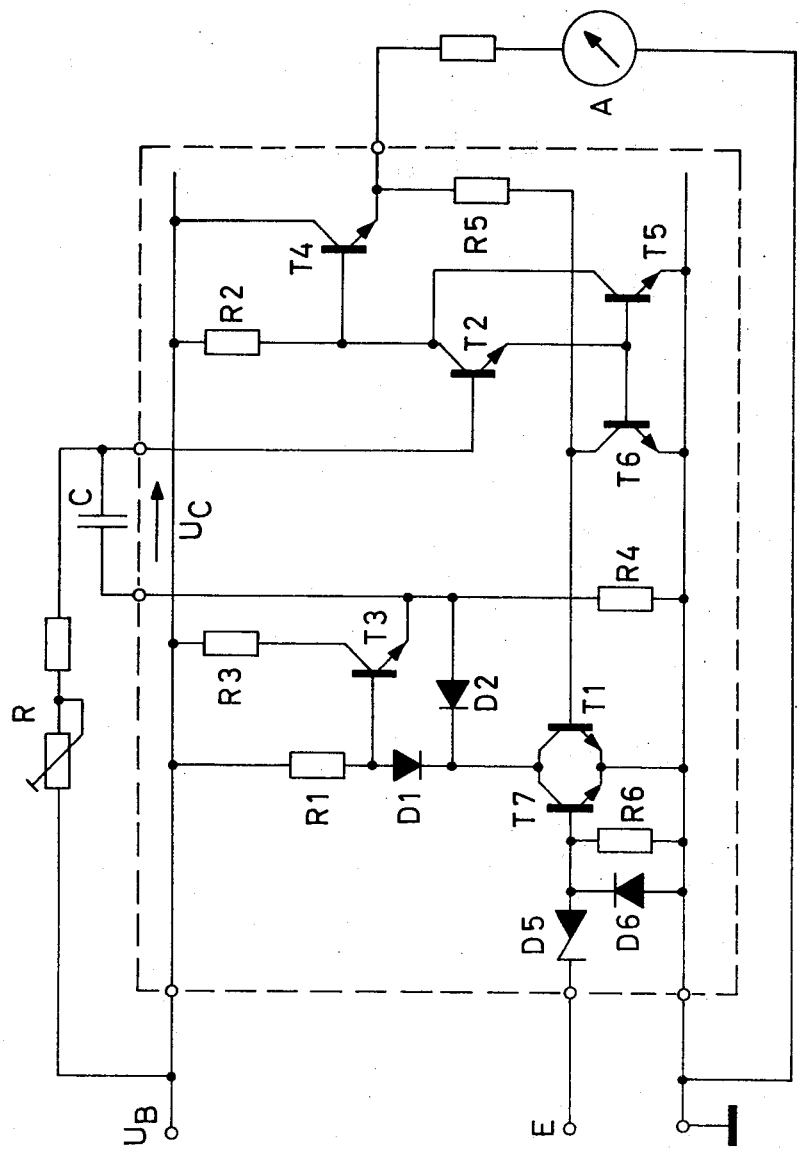
FIG. 1 shows a first type of embodiment of the inventive circuit arrangement.

In the circuit arrangement shown in FIG. 1, the two transistors T1 and T2 are the actual multivibrator transistors of which, during the stable switching state of the monostable multivibrator the transistor T1 is blocked, and the transistor T2 is unblocked. Between the collector of the blocked transistor T1 and its collector resistor R1 there is connected a first diode D1 whose polarity is in the direction of the collector current. To the common connecting point of both the diode and the collector resistor, there is connected the base of the decoupling transistor T3 whose collector, via the current limiting resistor R3, is connected to operating voltage. To the emitter of transistor T3, there are connected three further individual circuit elements, namely the one terminal of the capacitor C, the resistor R4, and the second diode D2. The other end of this diode is connected to the collector of the blocked transistor T1, so that the two diodes D1 and D2 are likewise connected to one another in accordance to the same polarity. The other terminal of resistor R4 is connected to the circuit ground.

The other end of the capacitor C is connected via the resistance combination R, to the operating voltage, with the resistance combination R serving as a variable charging resistance of the capacitor C. The common point connecting the charging resistor R and the capacitor C is connected to the base of the unblocked transistor T2. To the collector of the unblocked transistor T2 there are connected the base of the emitter-follower transistor T4 and the collector resistor R2 which, with its other end, is applied to the supply voltage $U_B$.

The emitter of the emitter-follower transistor T4 is coupled to the base of the blocked transistor T1 via resistor R5.

The emitter of the unblocked transistor T2 is coupled via the base-emitter path of a transistor T5 operating as a Darlington-amplifier, to the circuit ground. The standard integrating current measuring instrument A, for indicating the number of revolutions of a combustion engine, is applied to the emitter of the emitter-follower transistor T4 and, if necessary, is preceded by a resistor.

The base-emitter path of the blocked transistor T1 is connected in parallel with the collector-emitter path of the damping transistor T6 whose base, just like the base of the Darlington-transistor T5, is likewise connected to the emitter of the unblocked transistor T2.

Owing to the fact that the capacitor C is not connected directly to the collector of the blocked transistor T1, and that the components D1, D2, T3, R3, R4 are associated with this particular end of the capacitor C, there will result the inventive rapid charging of the capacitor C after the switching from the metastable to the stable switching state.

The two diodes D1 and D2, as well as the transistor T6 cause the circuit to be rendered insensitive to interference pulses from the battery voltage.

During the stable switching state the base-emitter path of the blocked transistor T1 is low-resistively short-circuited by the collector-emitter path of transistor T6, which substantially adds to the insensitivity to interference pulses. Moreover, the circuit is also protected against interference pulses by the diode D1, because this diode prevents a discharging of the charge as stored in the capacitor C, via the diode D2, the base-collector path of the decoupling transistor T3, and the resistor R3, in which case the base-collector path of this transistor, would be operated inversely. In order to prevent the capacitor from being discharged during a negative deep fade of voltage from the battery voltage $U_B$, the preconduction current flowing across the resistor R4 or the transistor T10 and the resistor R4' should be small with respect to the current flowing across the charging resistor R (T10 and R4', see FIG. 2).

The Darlington-transistor T5 makes it possible to operate the unblocked transistor T2 with a low base current, so that the charging resistor R can be designed to be high-ohmic, because the base current which is required for completely driving the transistors T5 and T6 into saturation, also at an unequal current distribution caused by the variation of its sample values, flows through the resistor R2 and the collector-emitter path of the conducting or unblocked transistor T2.

Triggering by means of the ignition pulse voltage is applied to the input terminal E, which effects blocked transistor T1 by having collector-emitter path of the blocked transistor T1 connected in parallel with the collector-emitter path of input transistor T7. Between the input terminal E and the base of the input transistor T7 there is arranged the Zener-diode D5. In addition thereto, there is still provided between the base of the input transistor T7 and the circuit ground, the diode D6, and parallel in relation thereto, the resistor R6. In the course of this, the diode D6 causes the negative components of the ignition pulse voltage to be rendered ineffective for the triggering, while the Zener-diode D5 takes care of providing a high input sensitivity level.

Figure 2:
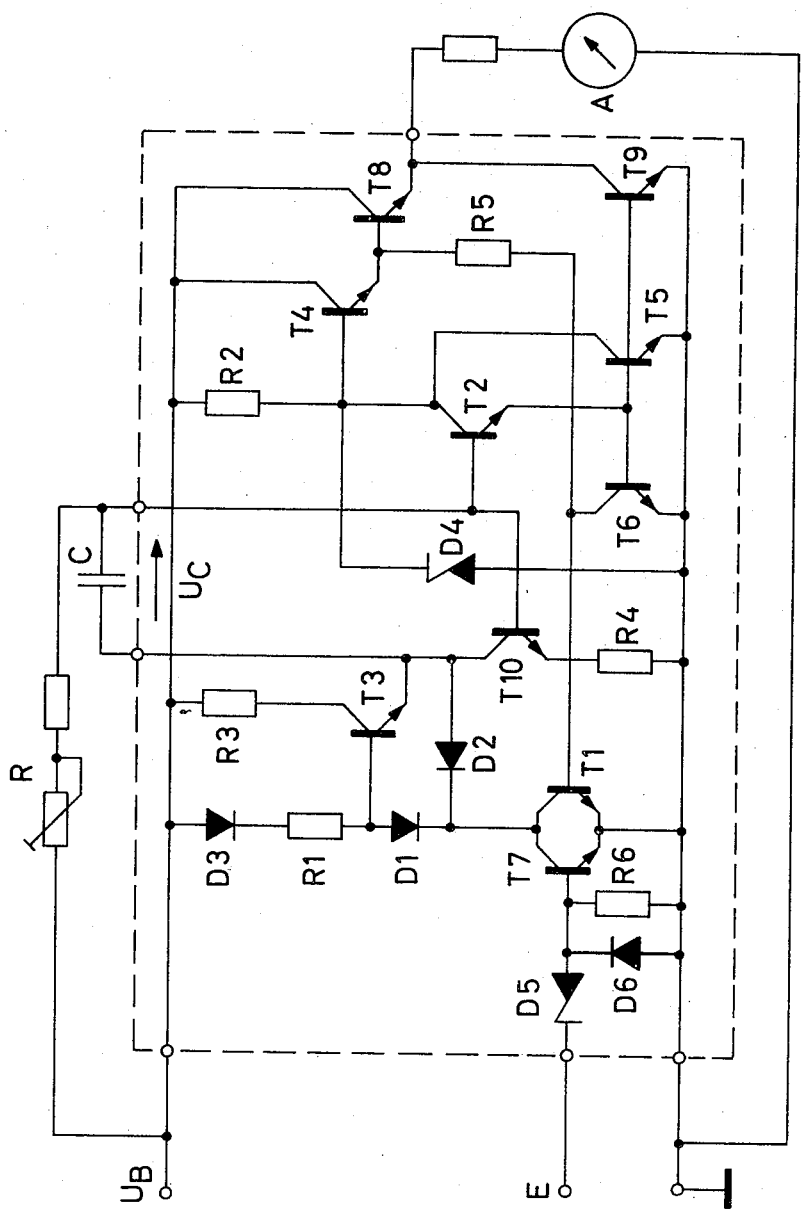
FIG. 2 shows an extended type of embodiment of the inventive circuit arrangement.

FIG. 2 shows a further type of embodiment of the inventive circuit arrangement. The circuit arrangement is as already described with reference to FIG. 1, and which is merely supplemented by further components so that, with respect to the example of embodiment according to FIG. 1, there will result an improved and optimum behavior of the circuit arrangement. It has been found that, with respect to a universal applicability and compatibility with different current measuring instruments, it is of advantage to supplement the integrated circuit at its output by a further Darlington-amplifying stage. To this end there is provide the Darlington-transistor T8, with the base thereof being connected to the emitter of the emitter-follower transistor T4, and with the emitter thereof extending to the current measuring instrument.

Moreover, it is of advantage if the current still flowing in the winding of the current measuring instrument after the changing over from the metastable to the stable switching state, owing to the inductive delay, does not flow through the resistor R2 and the base-emitter paths of the transistors T4 and T8. For this purposes, there is provided the further transistor T9. This transistor is applied with its collector to the emitter of transistor T8, and with its emitter to the circuit ground, while its base is connected to the emitter of the conducting or unblocked transistor T2. While the current is still flowing into the measuring instrument inductance after there is a change over from the metastable into the stable switching state, transistor T9 is operated inversely, with the current flowing across the resistor R2, the collector-emitter path of transistor T2 and the base-collector path of transistor T9.

In order to make the indication of the measuring instrument as independent as possible of the supply voltage, it is of an added advantage to stabilize the output voltage with the aid of a Zener-diode. In the present case this is accomplished in that the collector of the conducting or unblocked transistor T2 is connected to the circuit ground via the Zener-diode D4.

Finally, for precisely fixing the duration of the metastable switching state, the emitter resistor R4 of the emitter-follower transistor T3 is replaced by a further transistor T10 and associated emitter resistor R4' which is connected as a source of constant current. The emitter of transistor T10 is connected to that particular end or terminal of resistor R4' which is not connected to the circuit ground. The collector of transistor T10 is connected to the emitter of the decoupling transistor T3 and to the end of the diode D2 applied to the emitter thereof, so that the collector of the constant-current transistor T10 is also connected to the one terminal of the capacitor C. The base of transistor T10 is directly connected to the base of the unblocked transistor T2, to the other terminal of the capacitor C, and to one terminal of the charging resistor R.

Diode D3 aids in the temperature stability of the entire circuit. This diode is applied with its one end to the operating voltage $U_B$ and its polarity is in the direction of the collector current of transistor T1, and is arranged in series with both collector resistor R1 and diode D1.

The mode of operation of the invention circuit arrangement will now be explained in detail with reference to the example of embodiment shown in FIG. 2, which includes an explanation of the mode of operation of the circuit according to FIG. 1 when the additional components shown in FIG. 2 are omitted.

At first we consider the stable switching state. In this state the capacitor C is charged, and since transistor T1 is blocked in the stable switching state, the capacitor plate which is connected to the emitter of transistor T3, is more positive than the capacitor plate connected to the base of the conducting or unblocked transistor T2. This is indicated by the arrow designated $U_C$.

Besides the blocked transistor T1, the output transistor T8 and the input transistor T7, as well as the diodes D1 and D2 are nonconducting. All other transistors contained in the circuit are rendered conductive during the stable switching state. Thus, via the diode D3, the collector resistor R1, the base-emitter path of transistor T3 and the collector-emitter path of the constant-current transistor T10, there is flowing a preconducting current fixing an exactly defined charging level of the capacitor C.

Moreover, the emitter-follower transistor T4 is slightly current-conducting, with its emitter current flowing across the resistor R5 and via the collector-emitter path of the damping transistor T6 to the circuit ground. Since transistor T2 is unblocked, also the transistors T5 and T9 are unblocked.

If now, by a steep ignition pulse, the transistor T7 is rendered conductive, there will commence the metastable switching state. Owing to this also the diodes D1 and D2 are rendered conductive, and the decoupling transistor T3 is immediately blocked thereby. The base of this transistor, owing to the diode D1 which is now operated in the forward direction, is by the forward threshold voltage thereof more positive than the collector of transistor T1, while the emitter of transistor T3 is likewise by one forward threshold voltage more positive than the collector of transistor T1, so that the base-emitter voltage which is decisive for driving into saturation the transistor T3, practically equals zero. Accordingly, the emitter voltage of transistor T3 drops to a voltage value which is practically equal to the sum of both the collector-emitter saturation voltage of transistor T7 and the forward threshold voltage of the diode D2.

Since, with respect to this short instant of switch over, the charge as stored in capacitor C, has no chance of flowing off, the negative pulse effected by the dropping of the emitter voltage of transistor T3 on the one side of the capacitor C, is fully transferred to the other side of the capacitor C, i.e. the voltage at the base of the conducting or unblocked transistor T2, with respect to the circuit ground, suddenly becomes negative, so that this transistor is rendered nonconductive. In consequence of this, however, the transistors T5, T6, T9 and T10 are blocked. The collector voltage of transistor T2 therefore rises and controls the Zener-diode D4 into the active range so that in this way the base voltage of the emitter-follower transistor T4, as already mentioned hereinbefore, is stabilized.

The positive voltage step at the collector of transistor T2 is transferred via the transistors T4 and T8, to the current measuring instrument. Accordingly, at the emitter of transistor T8 there will appear an output voltage having reference to the circuit ground, which is equal to the breakdown voltage of the Zener-diode D4, less the two base-emitter threshold voltages of the transistors T4 and T8. By the output voltage pulse and across resistor R5, the transistor T1 is simultaneously rendered conductive, so that the further input pulses become ineffective.

Across the charging resistor R, the capacitor C is now charged in accordance with the time constant of this RC-network, so that the voltage at the base of transistor T2 is slowly caused to rise. As soon as this voltage reaches the amount of two base-emitter threshold voltages, namely that of transistors T2 and T5, there is reached the end of the metastable switching state, and the transistor T2 is at first rendered slightly conductive. On account of this, always less base current will be flowing in the transistor T1, so that the collector voltage of this transistor increases. This voltage rise is transferred via the transistor T3 and the capacitor C to the base of transistor T2, so that the latter is now rendered fully conductive, and suddenly serves to trigger the circuit back into its stable state. Finally, the capacitor very rapidly recharges itself via the decoupling transistor T3, as stated hereinbefore, with the charging current being restricted by the resistor R3.

The constant-current transistor T10 provides that in the stable switching state, a constant preconducting current will flow via the diode D3, across the resistor R1, and via the decoupling transistor T3, so that recharging of the capacitor C is effected as rapidly as possible towards a fixed potential.

In its integrated form, the inventive circuit arangement has proved most suitable for coping with all operational conditions as occurring in a motor vehicle.

It is to be understood that the foregoing description of this invention is made by way of example only and is not to be considered as a limitation on its scope.

I claim:

1. A monolithic integrable circuit for measuring the rate of revolutions of combustion engines, said circuit including a supply voltage, a monostable multivibrator being triggered by an ignition pulse voltage or a pulse voltage derived therefrom, and an integrating current measuring instrument coupled to the output of said multivibrator for indicating the number of revolutions, said multivibrator comprising a first transistor having an emitter, base and collector, said first transistor being nonconductive during the stable state of said multivibrator, a second transistor having an emitter, base and collector, said second transistor being conductive during the stable state of said multivibrator, a charging resistor coupling the base of said second transistor to said supply voltage, a capacitor A.C. coupling the collector of said first transistor to the base of said second transistor, the collector of said second transistor being D.C., coupled to the base of said first transistor wherein the improvement comprises:

a first collector resistor;

a first diode coupling said first collector resistor to the collector of said first transistor, the polarity of said first diode being in the direction of current flow through the collector of said first transistor;

a decoupling transistor having an emitter, base and collector, the base of said decoupling transistor being connected to the common point between said first diode and said first collector resistor, the emitter of said decoupling transistor being connected to one terminal of said capacitor;

a current limiting resistor coupling the collector of said decoupling transistor to said voltage supply;

a second diode coupling the emitter of said decoupling transistor, to the collector of said first transistor, the polarity of said first diode being in the direction of current flow through the collector of said first transistor;

means for coupling the emitter of said decoupling transistor to circuit ground; and means coupled to said second transistor for permitting said resistor to have a relatively high ohmic value and for providing that the duration of the metastable state is shorter than the time constant of the combination of said capacitor and said resistor.

2. A circuit according to claim 1, wherein said decoupling transistor means comprises a coupling resistor.

3. A circuit according to claim 1, wherein said decoupling transistor means comprise:

a third transistor having an emitter, base and collector, the collector of said third transistor being connected to the emitter of said decoupling transistor, the base of said third transistor being connected to the base of said second transistor and the other terminal of said capacitor; and a first emitter resistor coupling the emitter of said third transistor to circuit ground.

4. A circuit according to claim 1, further comprising:

a fourth transistor having an emitter, base and collector, the collector of said fourth transistor being connected to the collector of said first transistor, the emitter of said fourth transistor being connected to the emitter of said first transistor and to circuit ground;

a base resistor coupling the base of said fourth transistor to circuit ground;

a third diode coupling the base of said fourth transistor to circuit ground, the polarity of said third diode being in the direction of the flow of current through the base of said fourth transistor; and a first Zener diode coupling the ignition pulse voltage to the base of said fourth transistor, the polarity of said first Zener diode being in the opposite direction of the flow of current through the base of said fourth transistor.

5. A circuit according to claim 1, further comprising:

a fourth diode coupling said supply voltage to said first collector resistor, the polarity of said fourth diode being in the direction of the flow of current through the collector of said first transistor.

6. A circuit according to claim 1, wherein said second transistor means comprises:
a second collector resistor coupling the collector of said second transistor to said supply voltage;
an emitter follower transistor having an emitter, base and collector, the base of said emitter follower transistor being connected to the collector of said second transistor, the collector of said emitter follower transistor being connected to said supply voltage;
means for coupling the emitter of said emitter follower transistor to said integrating current measuring instrument;
a damping transistor having an emitter, base and collector, the emitter of said damping transistor being connected to circuit ground the base of said damping resistor being connected to the emitter of said second transistor;
an emitter follower resistor coupling the emitter of said emitter follower transistor to the collector of said damping transistor and the base of said first transistor; and
a fifth transistor having an emitter, base and collector, the emitter of said fifth transistor being connected to circuit ground, the base of said fifth transistor being connected to the emitter of said second transistor, and the collector of said fifth transistor being connected to the collector of said second transistor.

7. A circuit according to claim 6, wherein said emitter follower coupling means further includes:
another emitter follower transistor having an emitter, base and collector, the collector of said other emitter follower transistor being connected to said supply voltage, the base of said other emitter follower transistor being connected to the emitter of said emitter follower transistor, and the emitter of said other emitter follower transistor being coupled to said integrating current measuring instrument.

8. A circuit according to claim 7, further comprising:
a sixth transistor having an emitter, base and collector, the collector of said sixth transistor being connected to the emitter of said other emitter follower transistor, the emitter of said sixth transistor being connected to circuit ground, and the base of said sixth transsitor being connected to the base of said second transistor.

9. A circuit according to claim 6, further comprising:
a second Zener diode coupling the collector of said transistor to circuit ground, the polarity of said second Zener diode being in the direction of the flow of current through the collector of said second transistor.

References Cited
UNITED STATES PATENTS 3,590,379   6/1971   Fellerman _____ 324—169

ALFRED E. SMITH, Primary Examiner

U.S. Cl. X.R.

324—78 J, 166